UNITED STATES PATENT OFFICE.

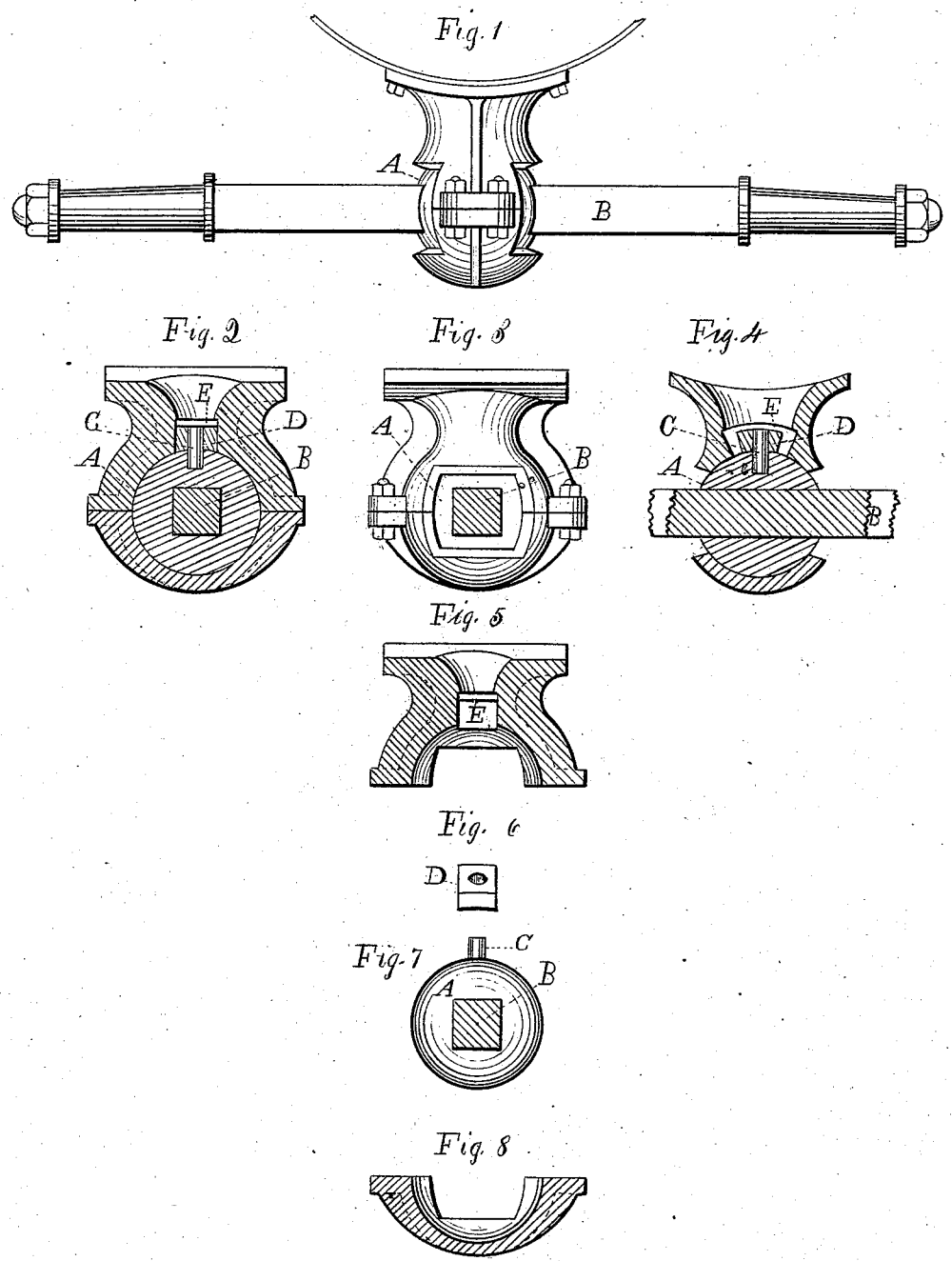

JOHN SINNAMON, OF OSWEGO, NEW YORK.

BALL-AND-SOCKET COUPLING FOR VEHICLE-AXLES.

SPECIFICATION forming part of Letters Patent No. 225,027, dated March 2, 1880.

Application filed December 24, 1879.

*To all whom it may concern:*

Be it known that I, JOHN SINNAMON, of the city and county of Oswego, and State of New York, have invented a new and useful Improvement in Ball-and-Socket Joints for Front Axles of Vehicles, of which the following is a specification.

Heretofore in applying such joints to axles the socket has generally been placed on top of the axle, and when so applied, the center of motion being above the center of the axle, the axle has a tendency to pitch forward, bringing the shell of the socket in contact with the ball-arm, thereby causing undue friction.

The object of my invention is to provide a ball-and-socket joint for front axles of vehicles which will allow the arms of the axle to swing freely in their horizontal and vertical planes, while the axle is not permitted to turn nor oscillate on its longitudinal axis.

The following is a full and correct description of my invention, reference being had to the accompanying drawings and the figures and letters noted thereon.

Figure 1 is a front view of an axle and joint embodying my invention, appearing, in this instance, as attached to the shell of a portable boiler, for which purpose it is especially adapted. Fig. 2 is a vertical transverse section of an axle and joint; Fig. 3, a side elevation of the joint; Fig. 4, a vertical longitudinal section of the same; and Figs. 5, 6, 7, and 8, details of parts separated.

The ball A is cast on or otherwise attached to the center of the axle B, the central line of axle passing through the center of the ball, said ball being provided with a stud, C, protruding from either the top or under side thereof, a block or slide, D, being fitted loosely over said stud, the ball with stud and block being confined in a socket the shell of which is formed in two parts bolted or otherwise fastened together in front and rear, and having sufficient openings to admit of the necessary play of the axle, the said socket being provided with an oblong radial slot, E, extending in a line with the axle and located either directly above or beneath the center line of the axle for the reception of the stud C and block D. The said block D, with the stud C, oscillating in the slot E on a radius from the center of the ball in a vertical plane with the axle, allows the arms of the axle to swing in their vertical plane, thereby compensating for any unevenness of ground over which the wheels of the vehicle may travel, and the stud C, turning in the block D, permits the axle to swing in its horizontal plane, while the block in contact with the sides of the slot E prevents the axle from turning on its longitudinal axis.

Having thus described my invention, what I claim is—

The combination of the axle B, the ball A, stud C, and block or slide D, with a socket, said socket being provided with a slot, E, substantially as herein described.

JOHN SINNAMON.

Witnesses:
JNO. H. FORSYTH,
F. W. MERRIAM.